UNITED STATES PATENT OFFICE.

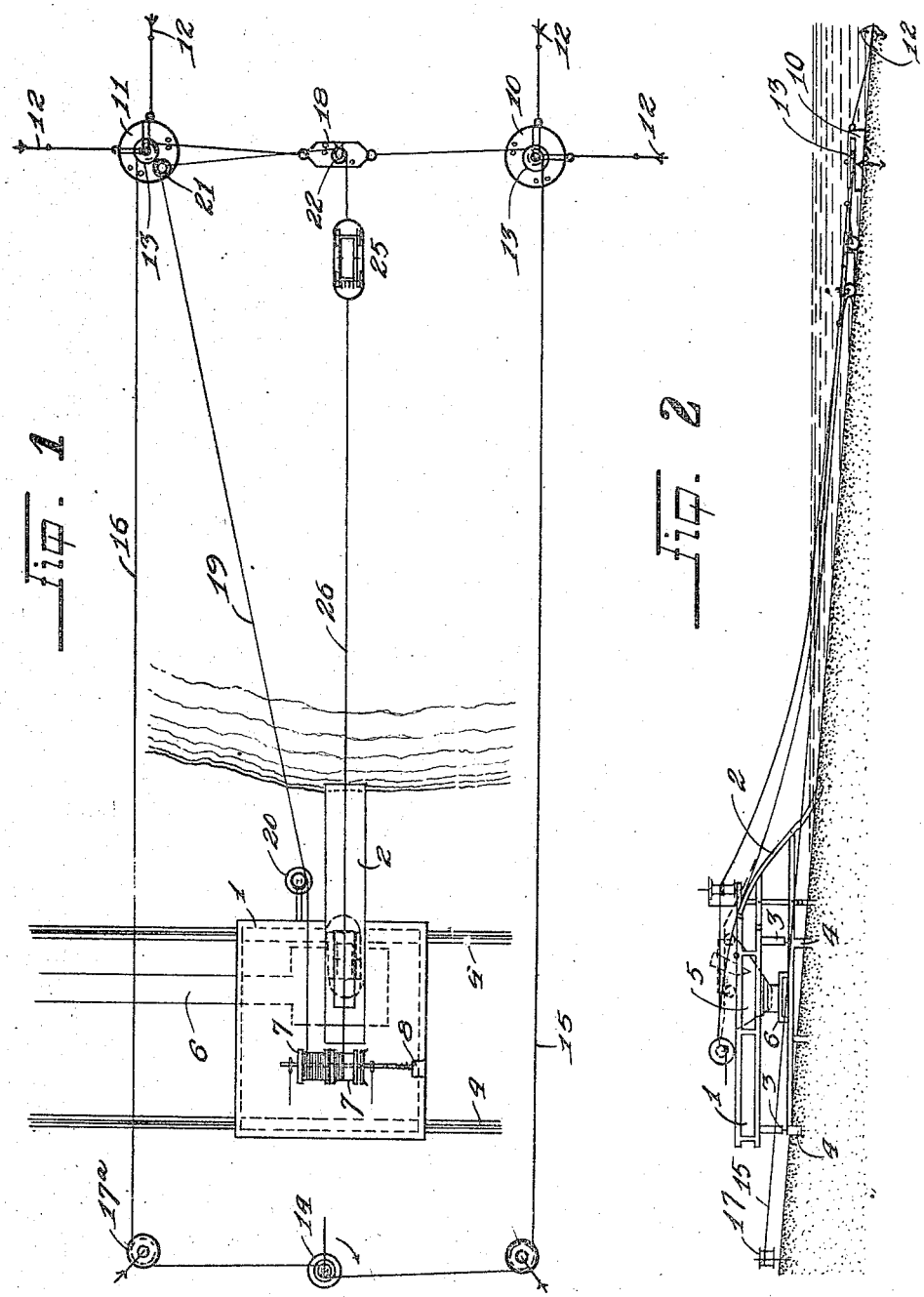

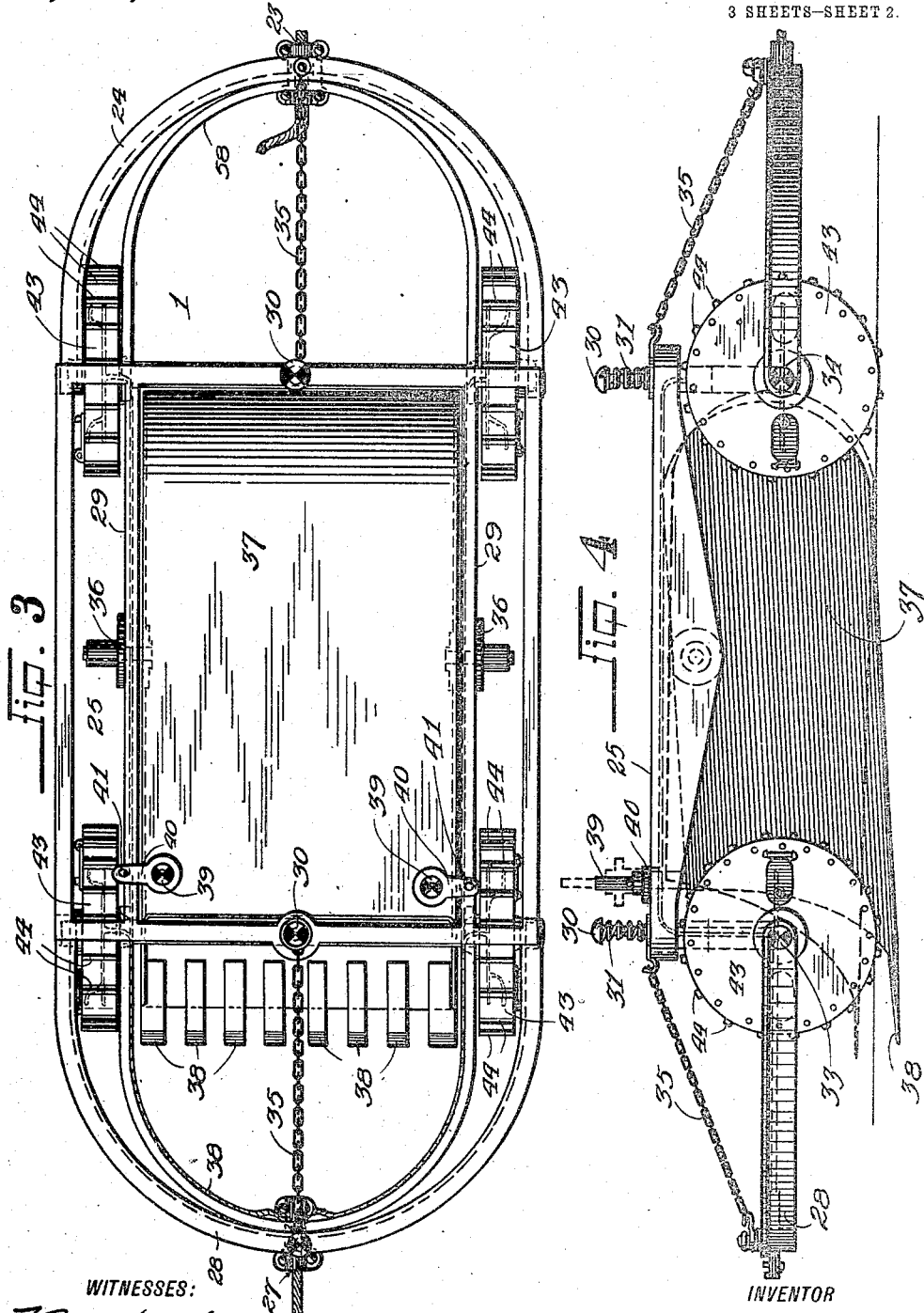

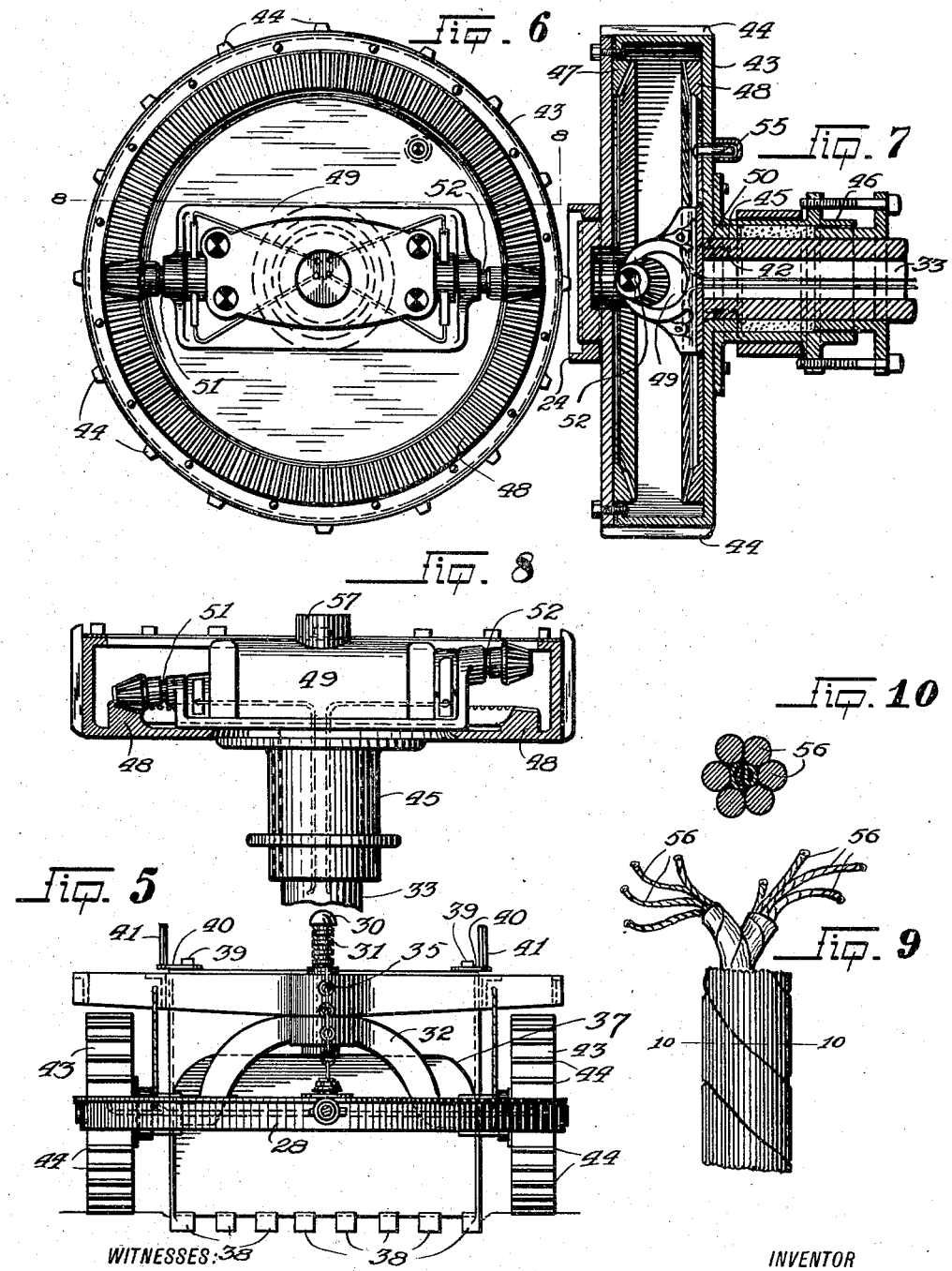

ISAAC PETERSON, OF OAKLAND, CALIFORNIA.

DREDGING-MACHINE.

1,034,501.   Specification of Letters Patent.   Patented Aug. 6, 1912.

Application filed December 28, 1909, Serial No. 535,260. Renewed December 26, 1911. Serial No. 667,940.

*To all whom it may concern:*

Be it known that I, ISAAC PETERSON, a citizen of the United States, residing at Oakland, in the county of Alameda and State of California, have invented certain new and useful Improvements in Dredging-Machines, of which the following is a specification.

This invention relates to the subject of excavating, and the principal object of the same is to provide an excavating apparatus that is adapted for use in connection with placer mining.

In carrying out the object of the invention generally stated above it is contemplated providing a movable dumping platform that is equipped with cable operating drums; a shovel that has cable connections with said drums so that the shovel may be drawn to or away from the platform and which transports said shovel in a straight direction relative to the said platform, and shifting cables and operating means therefor which coöperate with anchored means to permit the shovel to be moved laterally as the platform is similarly moved so that the shovel may be caused to operate upon a different portion of the surface during its digging movement.

In connection with the foregoing, it is contemplated providing the shovel with traction wheels that are each equipped with a motor, the motors being energized by feed wires that are inclosed by and form a part of the propelling cables, so that the said traction wheels coöperate with said cables and thereby minimize the power necessary to pull the shovel to or from the dumping platform.

In the practical application of the invention it will be understood, of course, that the essential features thereof are susceptible of changes in details and structural arrangements, one preferred and practical embodiment of which is shown in the accompanying drawings, wherein:—

Figure 1 is a top plan view, shown diagrammatically, of the improved excavating apparatus. Fig. 2 is a side view. Fig. 3 is a top plan view of the shovel employed. Fig. 4 is a side view thereof. Fig. 5 is an end view of the shovel. Fig. 6 is a view in side elevation of one of the wheels of the shovel, one side plate thereof being removed to expose the interior of the wheel. Fig. 7 is a central vertical sectional view of one of the said wheels, part of the axle thereof being also shown. Fig. 8 is a horizontal sectional view taken substantially on the line 8—8, Fig. 6. Fig. 9 is a fragmentary view of one of the propelling cables. Fig. 10 is a sectional view taken on the line 10—10, Fig. 9.

In the accompanying drawing the improved excavating apparatus has been shown as used for placer mining, the dumping platform 1 being shown on a beach front and provided with an apron or runway 2 that extends slightly beyond the water's edge. Said platform 1 is provided with supporting rollers 3 that are mounted on tracks 4 so that said platform may be bodily moved along the beach front when necessary or desirable. A hopper 5 is carried by the platform at the inner end of the runway 2, said hopper communicating with a sluice box 6 beneath the platform.

A pair of drums 7—8 are mounted on the platform 1, said drums being oppositely driven by a motor 9 also mounted on platform 1. Said motor and drums are of the usual type that are employed for operating excavating shovels, hence the same have only been conventionally illustrated. A pair of drum supporting casings 10—11 are retained submerged and suitably spaced apart by means of the anchors 12, said casing carrying an enlarged central drum 13. A windlass 14 is suitably mounted on the beach behind the platform 1 and has a cable wound thereon whose flights 15—16 project in opposite directions. Flight 15 passes over a beach pulley 17 to and around the drum 13 of casing 10 and has its end fastened to one end of a shovel shifting frame 18 that is located in alinement with and between casings 10—11. The other flight 16 passes over a beach pulley 17ª thence to and around drum 13 of casing 11 and is fastened to the opposite end of frame 18. This arrangement of cable and shore windlass providing means whereby the said frame 18 may be bodily moved relative to casings 10—11 by revolving windlass 14, as will be obvious.

A cable 19 extends from drum 7 to and over a guide pulley 20 carried by platform 1, thence to and over a pulley 21 on casing 10, and from pulley 21 it extends to and over a pulley 22 on frame 18 and is then extended toward the platform 1 and is clamped within an opening 23 in the outwardly rounded guard rail 24 at the rear end of a shovel 25. Another cable 26 extends from drum 8 in a straight line to and through a clamping opening 27 in the front guard rail 28 of the shovel 25. As will be obvious, cable 19 is used for drawing shovel 25 toward frame 18, while cable 26 draws the shovel to the platform 1 where it dumps its load through the hopper 5 to the sluice box 6.

The shovel 25 is composed of a supporting frame 29 that is provided with a front and rear king bolt 30 that has a spring 31 coiled about it so that said bolts will yieldably and pivotally support the hangers 32 for the front and rear axles 33—34. Said king bolts also have one end of a supporting chain 35 connected to them, the other end of said chains being fastened to the central forward portions of the guard rails. Side bearings 36 are carried by the shovel frame 29 in which the shovel body 37 is pivotally supported. Said body has the bottom of its open end provided with forwardly projecting cutting teeth 38. At the forward end of the top of the body 37 a pair of oppositely disposed upwardly projecting pivot lugs 39 are provided each being equipped with a latching lip 40 having a handgrip 41 so that said lips may be thrown over the sides of the frame 29 to retain the shovel body in a position where its cutting teeth 38 will be clear of the surface being excavated.

The front and rear axles 33—34 are of duplicate construction and are hollow, the outer end of each being internally threaded as indicated at 42. A pair of wheels 43 are provided for each axle, the wheels being duplicates and each in the form of a hollow casing having peripheral teeth 44. The wheels are provided with a sleeve extension 45 that is fitted over the end of its axle and is held watertight thereon by the stuffing box 46. Two enlarged gear rings 47—48 are arranged within each wheel, one ring being fast on each side thereof. An electric motor 49 is also within each wheel, said motor having an externally threaded supporting sleeve 50 that has a rigid but detachable threaded engagement with the internally threaded end 42 of the axle. The motor has oppositely projecting end shafts 51—52, that are arranged on an incline and terminate in bevel gears 53—54, that are held in mesh with the gear rings 47—48. The wheels are preferably air tight and may be provided with a valve controlled air vent 55.

The shovel operating cables 19—26 are of the type shown in Figs. 9 and 10 and inclose the feed wires 56. The cables extend through the clamping opening of the guard rails and their feed wires branch off and pass through the hollow axles and connect with the wheel motors.

The guard rails 24—28 are of duplicate construction and have their ends supported by the lug 57 that project centrally from the outer side of each wheel. Said rails are also braced by the yoke 58 that has its ends engaged over the stuffing box of the axles.

It will be seen from the foregoing that the improved excavating apparatus provides simple but effective means whereby the shovel may be readily controlled from the beach to facilitate its excavating operations, and also that through the described use of motors in connection with each wheel, the operations of the shovel are performed with the expenditure of the minimum amount of power.

It will be understood, of course, that in some cases it may not be possible to use the shovel shifting means, nor the cable 19, such for example, when excavating is being done on sea coasts where the rough water will not permit of the use of the anchored drums. In such cases, the shovels 25, through their described means of self-propulsion, may be permitted to run out to the desired distance and then be drawn in by the use of the cable 26.

What I claim as my invention is:—

1. An apparatus of the character described comprising an excavator, wheels therefor, a motor for operating each wheel, cables coöperating with said wheels to propel said excavator said cables inclosing feed wires for said motors, and means for operating said cables.

2. An apparatus of the character described comprising an excavator, hollow wheels therefor, a motor in each wheel for propelling the same, and cables coöperating with said motors to propel said excavator, said cable inclosing feed wires for said motors.

3. An apparatus of the character described comprising a movable dumping platform, a sluice box arranged beneath said platform, a hopper carried by said platform and communicating with said sluice box, an excavator for delivering material to said hopper, means for operating said excavator, and means for shifting the cutting position of said excavator.

4. An apparatus of the character described comprising an excavator frame provided with bearings, a shovel body pivotally mounted in said bearings, upstanding pivot studs projecting from said body, a latching lip projecting from each stud and adapted to be engaged with said frame to retain said body spaced from the surface over which it is traveling, and propelling means for said excavator.

5. An apparatus of the character described comprising an excavator, wheels therefor, a notch for each wheel, a guard rail for each end of said excavator and provided with clamped openings, a cable passing through each clamping opening, feed wires inclosed by said cables and connected with said motors, and means for operating said cables to cause the same to coöperate with said motors to propel the excavator.

6. An apparatus of the character described comprising a dumping platform, a windlass therefor, a cable wound upon said windlass, and an excavator provided with self-propelling means, said excavator being connected to said cable.

7. An apparatus of the character described comprising an excavator frame, wheels therefor, an electric motor for each wheel, a dumping platform, a winding cable extending therefrom and connected to said frame, and feed wires for said motors inclosed by said cable.

8. An apparatus of the character described comprising a dumping platform, a motor driven excavator, a winding cable connecting said excavator to said platform, and means controlled from said platform for shifting the digging position of said excavator.

9. An apparatus of the character described comprising a self-propelled excavator, a dumping platform, a cable connection between said platform and said excavator, and means controlled from said platform for shifting the digging position of said excavator.

10. An apparatus of the character described comprising an excavator frame, wheels therefor, an electric motor for operating each wheel, dumping mechanism, a winding cable connection between said dumping mechanism and said frame, and feed wires for said motors inclosed by said winding cable.

In testimony whereof I affix my signature in presence of two witnesses.

ISAAC PETERSON.

Witnesses:
F. P. SCHROEDER,
H. C. SCHROEDER.

Copies of this patent may be obtained for five cents each, by addressing the "Commissioner of Patents, Washington, D. C."